Figure 1:
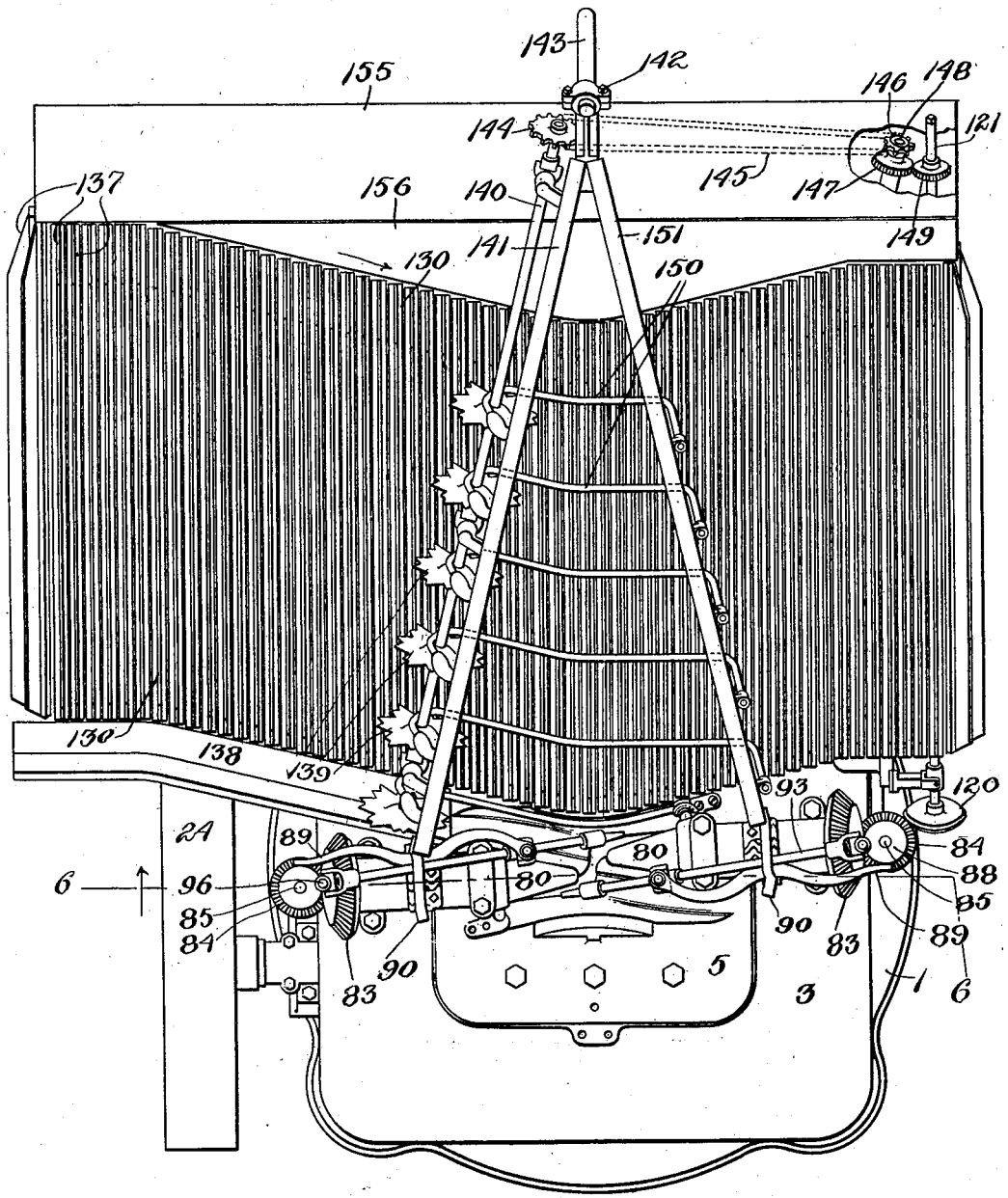

No. 756,099. PATENTED MAR. 29, 1904.
J. F. COWLEY.
MACHINE FOR COMPRESSING FIBROUS MATERIALS.
APPLICATION FILED APR. 27, 1903.
NO MODEL. 11 SHEETS—SHEET 1.

Witnesses:
Joseph T. Brennan
Arthur J. Randall

Inventor:
James F. Cowley
by Roberts & Mitchell
Attorneys.

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 2.

Witnesses:
Inventor:
James T. Cowley
by Roberts & Mitchell
Attorneys

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 4.

Witnesses:
Joseph T. Brennan
Arthur T. Randall

Inventor:
James T. Cowley
by Roberts & Mitchell
Attorneys.

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 6.

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 8.

Witnesses:
Joseph T. Brennan
Arthur T. Randall

Inventor:
James T. Cowley
by Roberts & Mitchell
Attorneys.

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 9.
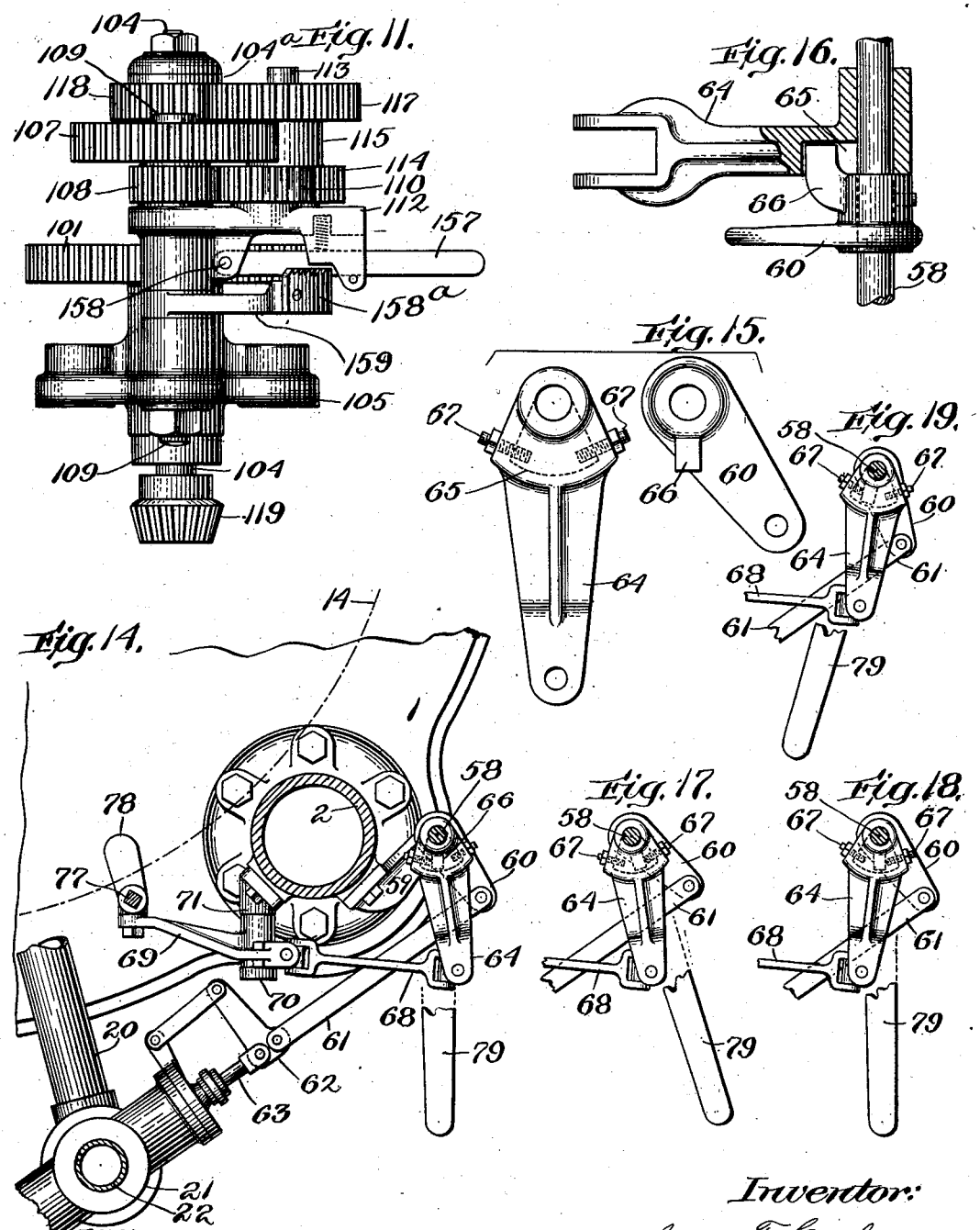

No. 756,099. PATENTED MAR. 29, 1904.
J. T. COWLEY.
MACHINE FOR COMPRESSING FIBROUS MATERIALS.
APPLICATION FILED APR. 27, 1903.
NO MODEL. 11 SHEETS—SHEET 10.
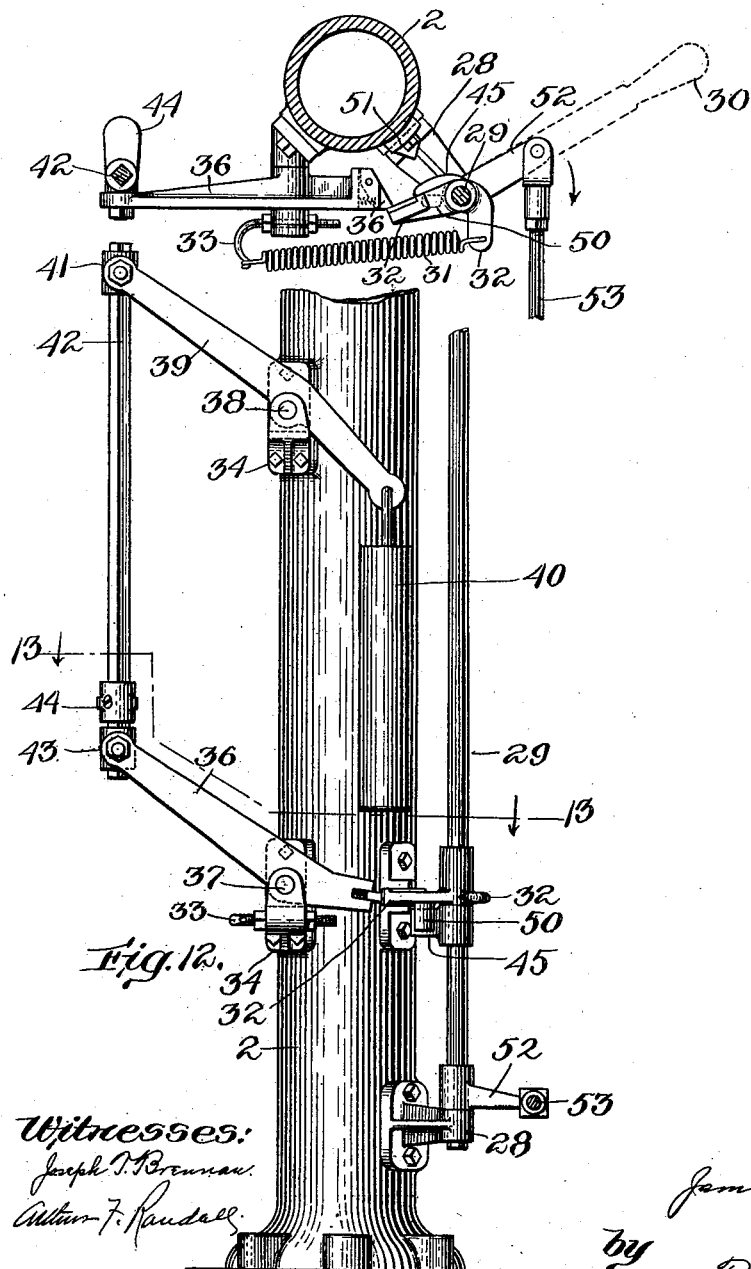

No. 756,099. PATENTED MAR. 29, 1904.
J. T. COWLEY.
MACHINE FOR COMPRESSING FIBROUS MATERIALS.
APPLICATION FILED APR. 27, 1903.

NO MODEL. 11 SHEETS—SHEET 11.

Witnesses:
Joseph T. Brennan
Arthur T. Randall

Inventor:
James T. Cowley
by Roberts & Mitchell
Attorneys.

No. 756,099. Patented March 29, 1904.

UNITED STATES PATENT OFFICE.

JAMES T. COWLEY, OF BOSTON, MASSACHUSETTS.

MACHINE FOR COMPRESSING FIBROUS MATERIALS.

SPECIFICATION forming part of Letters Patent No. 756,099, dated March 29, 1904.

Application filed April 27, 1903. Serial No. 154,429. (No model.)

*To all whom it may concern:*

Be it known that I, JAMES T. COWLEY, a citizen of the United States, and a resident of Boston, in the county of Suffolk and State of Massachusetts, have invented new and useful Improvements in Machines for Compressing Fibrous Materials, of which the following is a specification.

My invention relates to machines for compressing fibrous materials, and has for its object to improve the construction as well as to improve the efficiency and increase the capacity of machines of this character.

In particular my invention has for its object to provide a machine of the above character which will be peculiarly adapted to operate upon very long fibers—such, for example, as hemp, jute, and the like—as well as to operate upon fibers of ordinary length.

My improved machine comprises a fixed head-plate provided with one or more slots through which the fibrous material passes from the feed side of the head-plate to the compression side. Upon the compression side of the head-plate and coöperating therewith is a rotatable jack, which is movable toward and from the slotted head-plate. The jack is supported by means which provide a yielding resistance to the movement of the jack away from the fixed head-plate under pressure from the growing bale which forms between the jack and head-plate, and means are also provided for positively rotating the jack, the result of which construction is that when the machine is in operation the fibrous material upon the feed side of the fixed head-plate passes or is drawn through the slots into position between the head-plate and the rotating jack, where it forms into a compressed body or bale which is rotated by the jack and whose density is in proportion to the resistance which the jack offers to the growth of the bale, which resistance is adjustable. Thus it will be seen that this feature of my invention, briefly stated, consists in making the yielding jack rotatable and in providing means for rotating it, whereby the heretofore customary compression-chamber, which has been the rotating member of some machines of this character as heretofore constructed, is dispensed with, as are also the necessary driving mechanism and supports for the rotatable compression-chamber. Moreover, the presence of the compression-chamber surrounding part of the compressed body of fiber made it necessary in some forms of machines heretofore used to provide cutting-off mechanism whereby that part of the compressed body of fiber protruding from the compression-chamber could be detached from the part within the compression-chamber and removed from the machine and mechanism also to hold the mass within the compression-chamber from expansion. By making the jack positively rotatable, as above described, and causing the jack to rotate the forming bale and dispensing with the compression-chamber the whole of the compressed body of fiber is accessible and may be removed from the machine after having had stays applied to it, thus obviating the necessity for cutting-off knives and complementary mechanism and making it possible to remove the entire contents of the press at any time. Automatic means are also provided for stopping the rotation of the jack when the body of compressed fiber has grown to a predetermined size, and this constitutes another feature of my invention, the importance of which is due to the fact that in practice it is highly desirable that all of the bales shall be of as nearly the same size and weight as possible, a result which this feature of my invention secures. Herein I have also shown a jack whose cylinder communicates with a conduit in which is a valve controlling the admission of fluid under pressure to the cylinder of the jack. By means of this valve the cylinder of the jack may be connected through the conduit directly with the supply of fluid under pressure and the jack thereby moved quickly toward the head-plate, and in conjunction with this valve I have herein provided as a feature of my invention automatic means for closing said valve when the jack moving toward the head-plate reaches the predetermined limit of its movement in that direction.

Another feature of my invention consists in providing an exhaust-conduit for the cylinder of the jack, which is controlled by a valve which when open provides a free exit for the fluid, in the cylinder of the jack and permits the jack to move away from the head-plate, and in providing in conjunction therewith means for closing said valve when the jack moving away from the head-plate reaches the predetermined limit of its movement in that direction. In the best form of my invention, as herein shown, a three-way valve is employed for controlling both the supply and exhaust conduits, by means of which the operator may rapidly move the jack toward and from the head-plate at will, means being provided which automatically closes said valve when the jack moving in either direction reaches the predetermined limit of its movement. Means are also provided for automatically relieving the cylinder of fluid under back pressure on the jack caused by the growing body of material between the jack and the head-plate when both the supply and exhaust conduits are closed, so as to provide a constant yielding resistance to the movement of the jack away from the head-plate under pressure from the growing bale. Preferably this automatic relief is provided for in a by-pass around the three-way valve and connecting the jack-cylinder with the supply of fluid under pressure, which by-pass is controlled by an automatically-acting relief-valve, so that in order that the bale may grow it must first create a back pressure on the automatic relief-valve greater than the pressure holding the relief-valve closed. In this manner the fibers are compressed as they are incorporated in the bale and the bale while being formed is held against expansion.

The means herein shown for feeding the fibrous material up to the slot or slots of the head-plate also constitutes a feature of my invention, though not an essential one, said means being particularly designed for feeding very long fibers, such as hemp or jute, and it is to be understood that any other suitable feed may, if desired, be substituted in lieu thereof to suit the character of fiber to be operated upon.

Other features of my invention are hereinafter pointed out.

Figure 2:
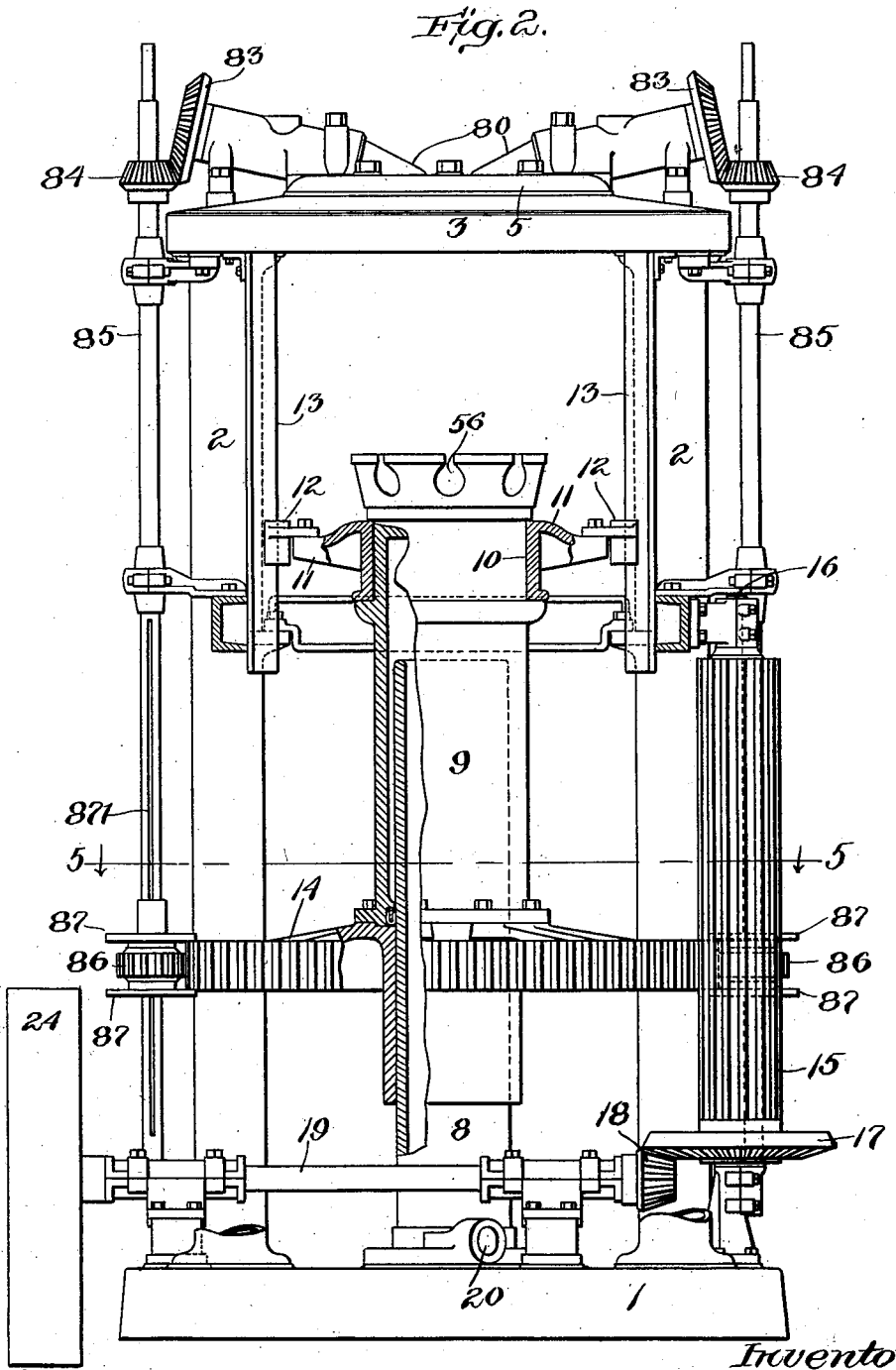
Figure 3:
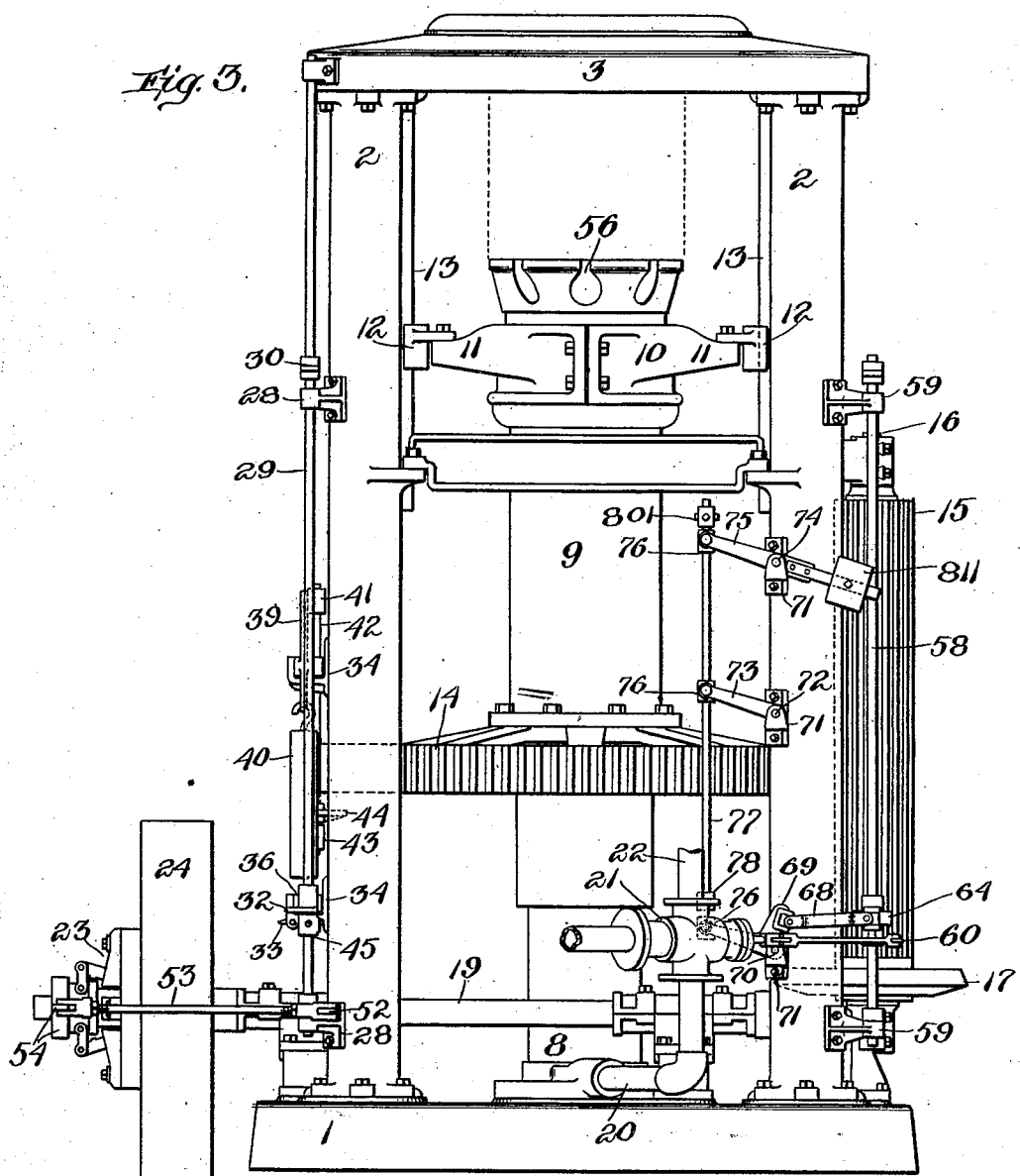
Figure 4:
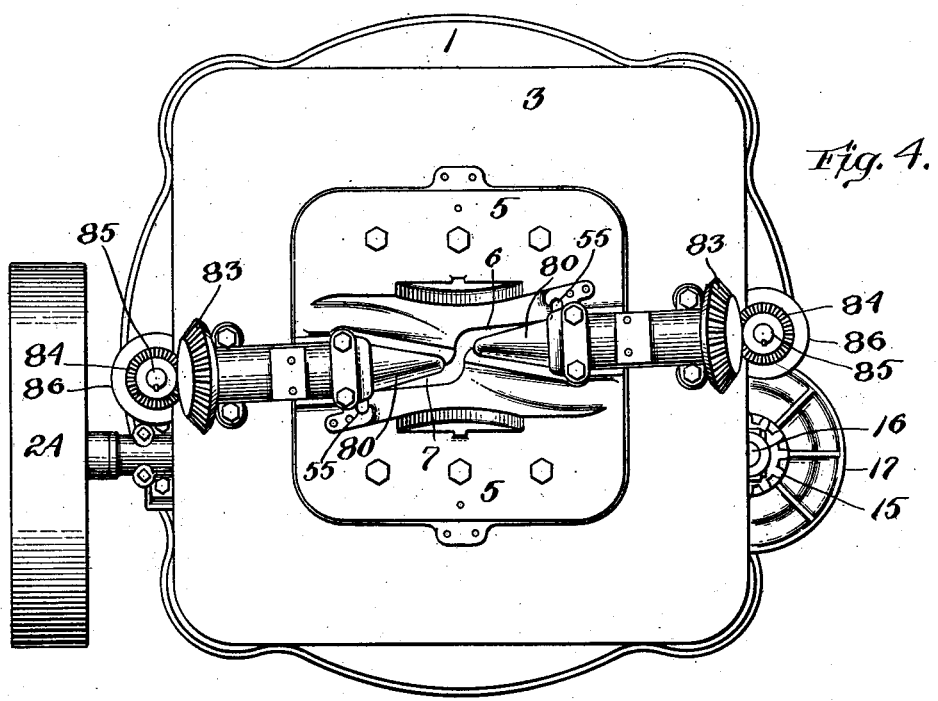
Figure 5:
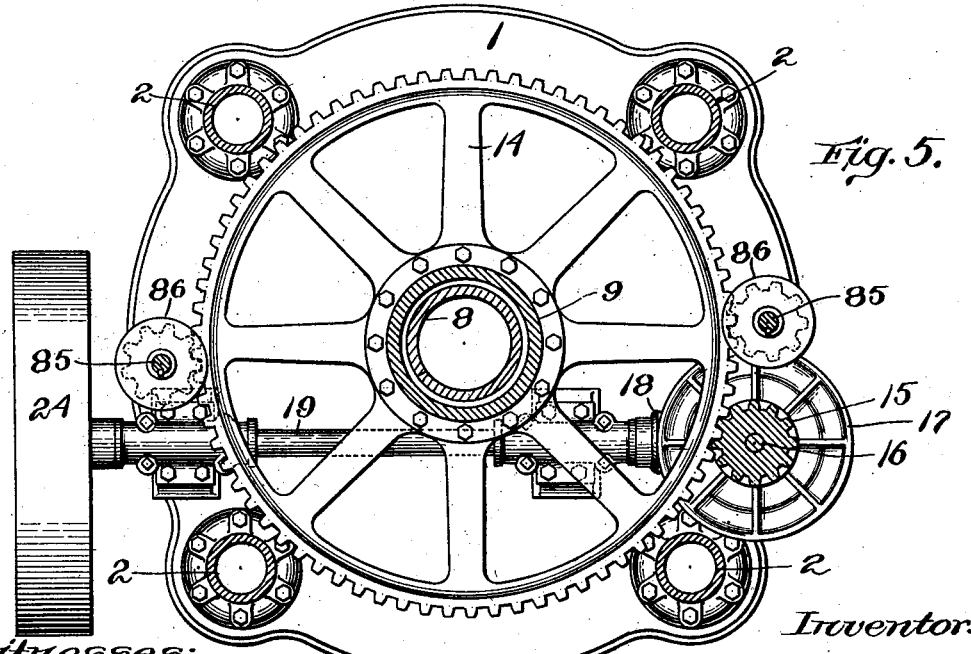
Figure 6:
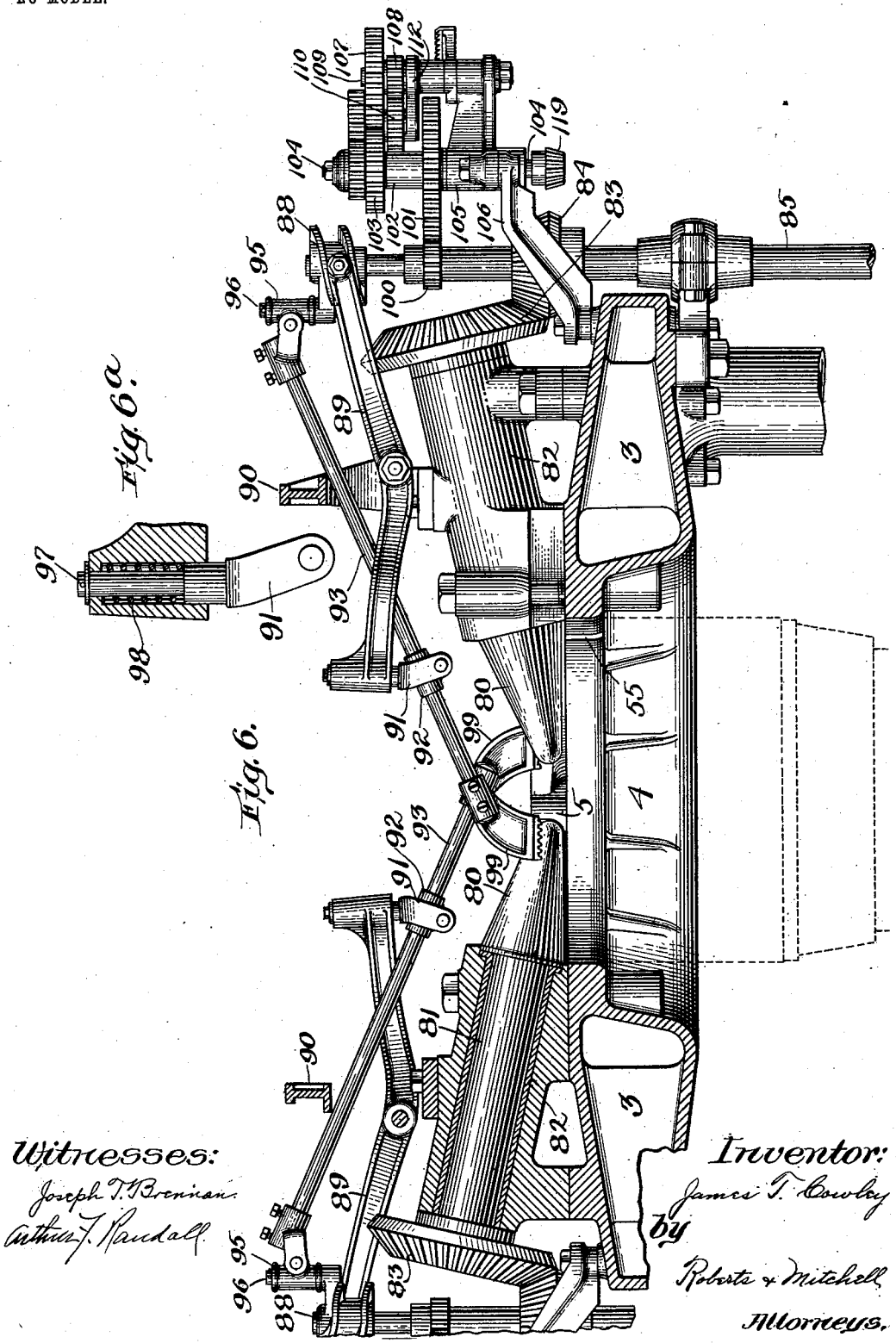
Figure 7:
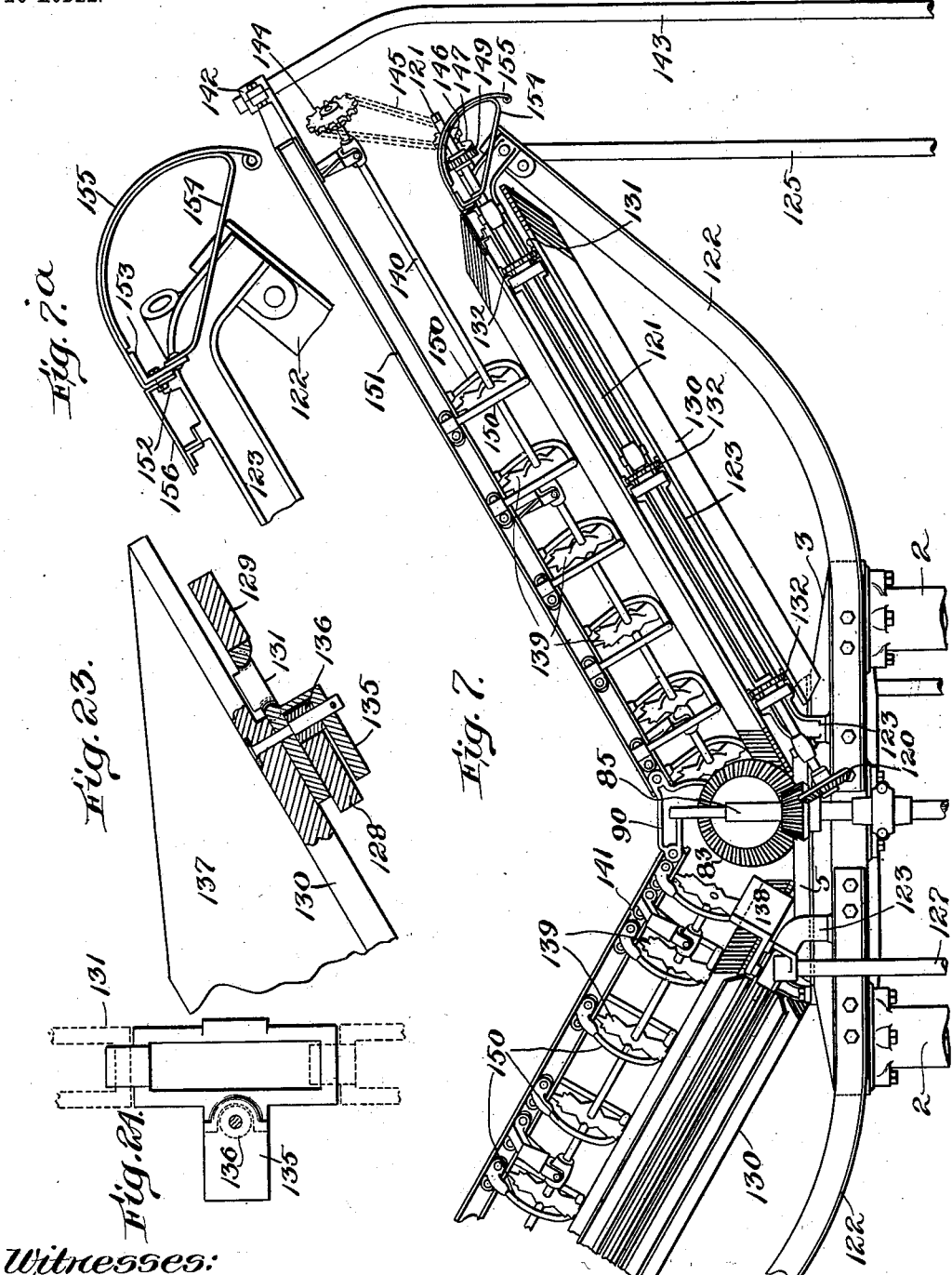
Figure 8:
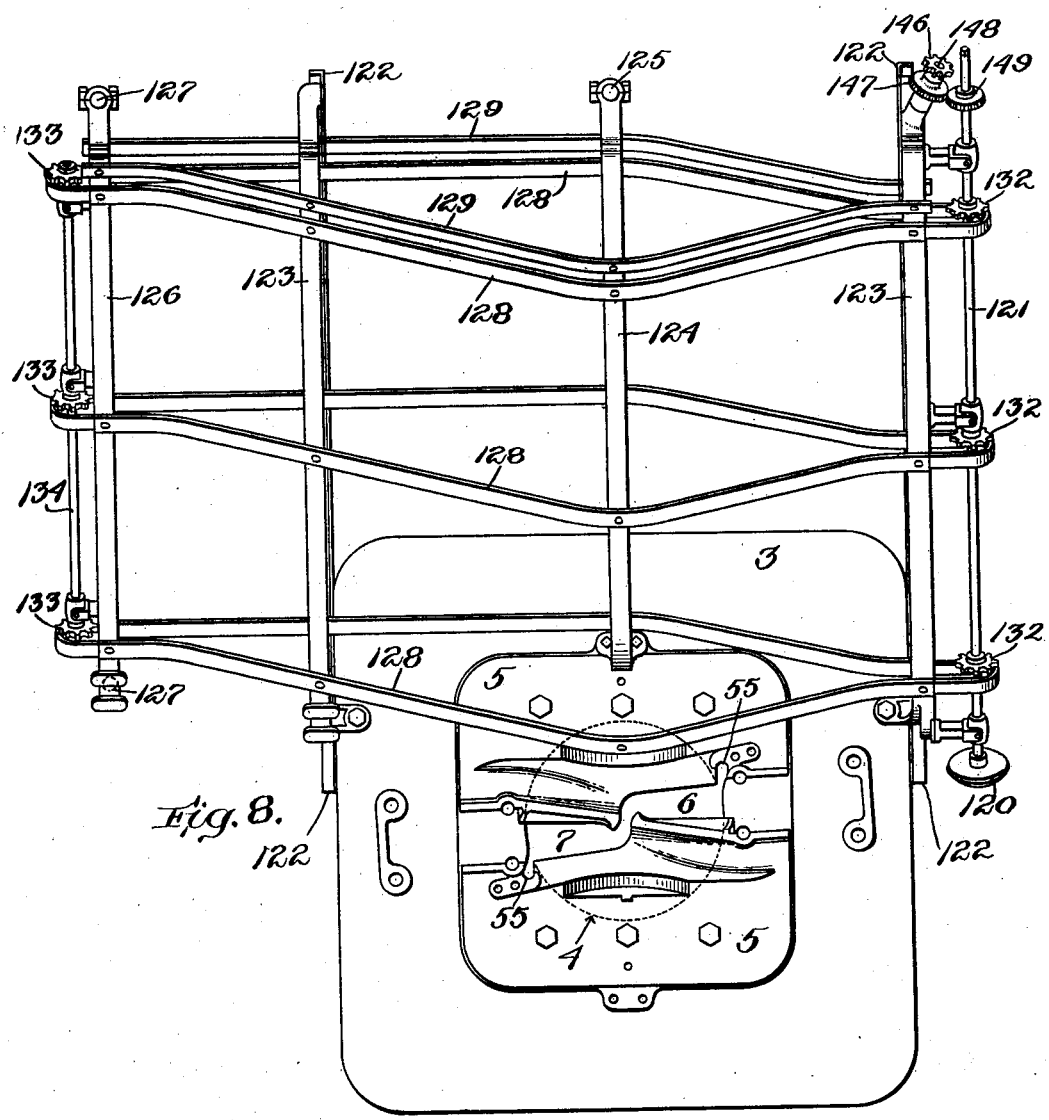
Figures 9, 10:
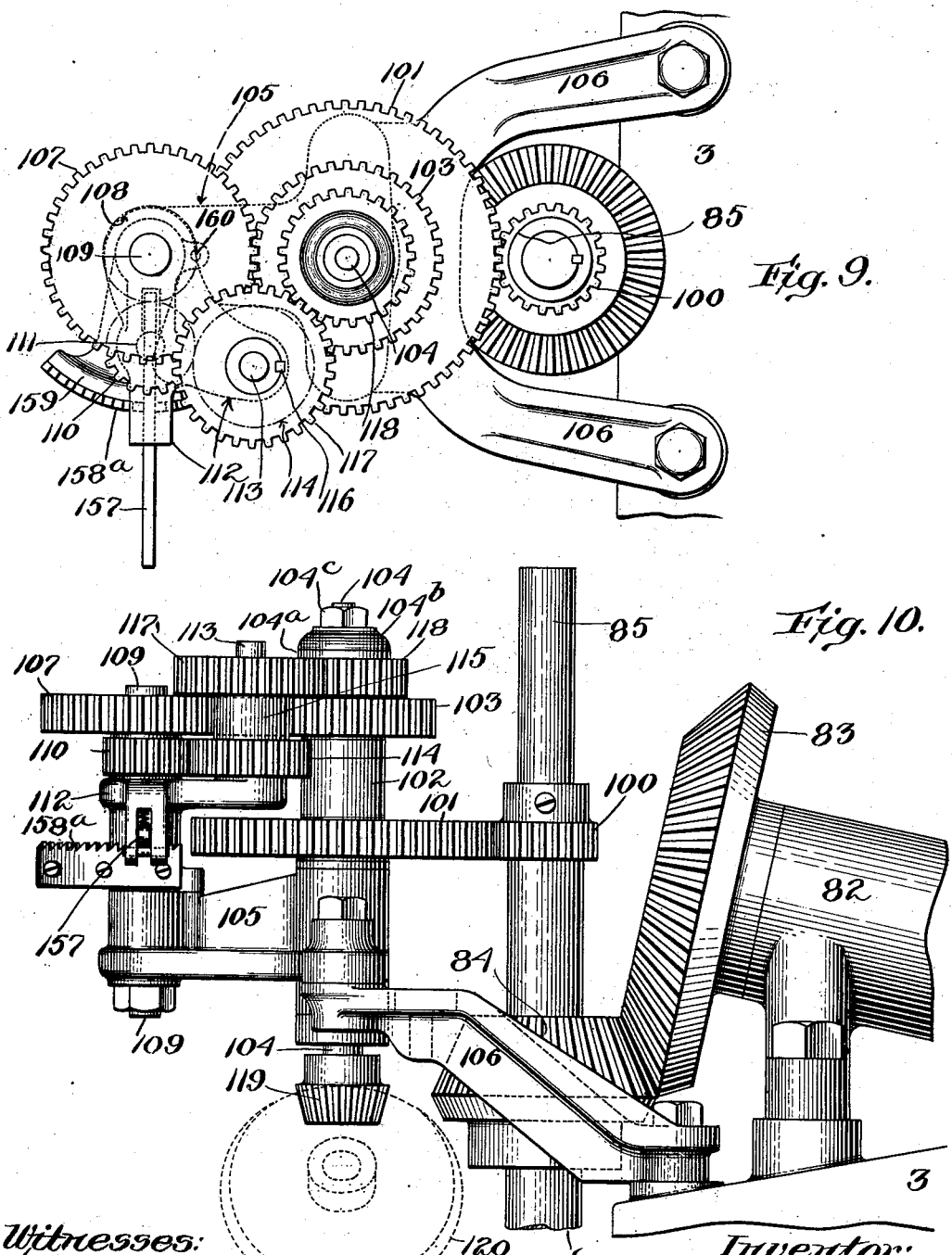
Figure 20:
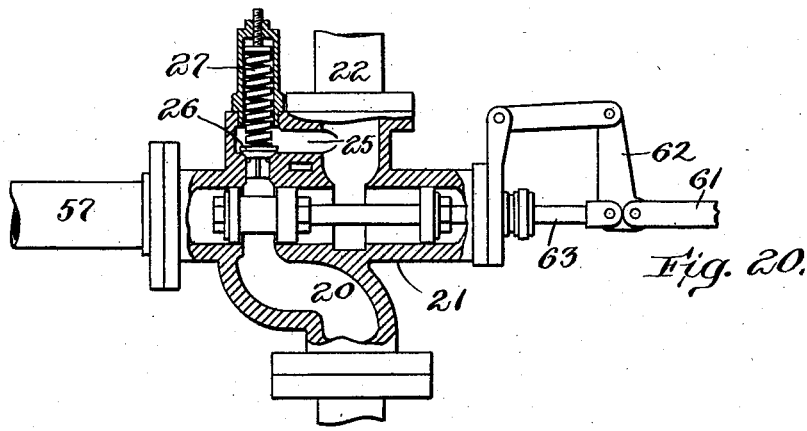
Figure 22:
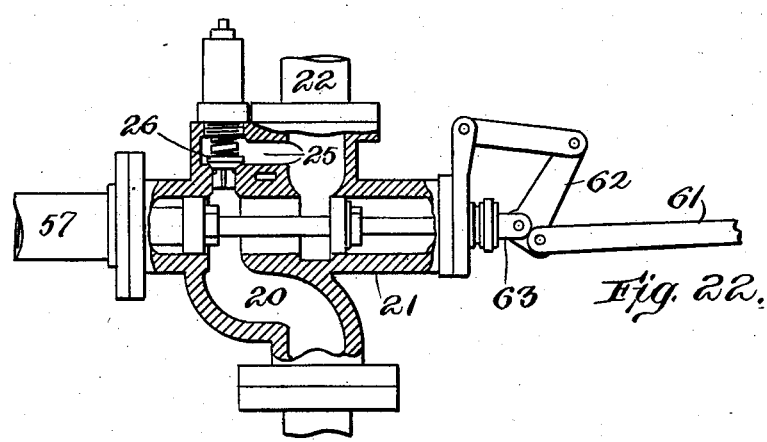
Figure 21:
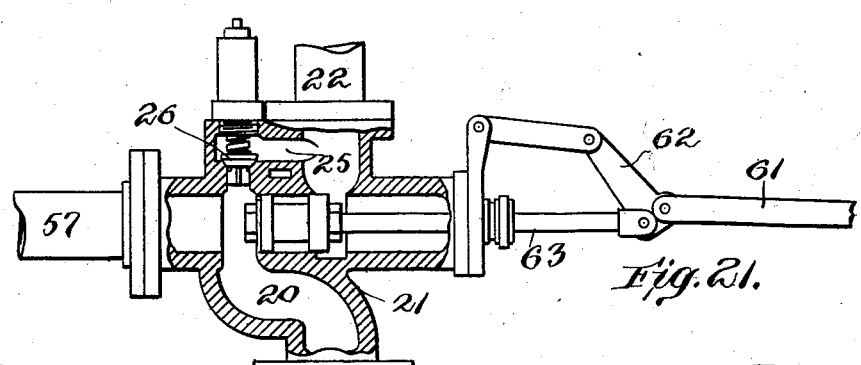

In the accompanying drawings, Figure 1 is a plan view of my improved machine for compressing fibrous materials, part of the feed mechanism on one side of the machine being omitted for clearness. Fig. 2 is a front elevation, partly broken away and in section, of the machine shown in Fig. 1. Fig. 3 is a like view with some of the features shown in Fig. 2 omitted and with some other features added. Fig. 4 is a plan view of the machine shown in Fig. 1 with practically all of the feed mechanism except the rolls hereinafter described omitted for clearness. Fig. 5 is a transverse section on line 5 5 of Fig. 2 as viewed in the direction indicated by the arrows. Fig. 6 is a section on line 6 6 of Fig. 1. Fig. 6ª is an enlarged detail of a portion of Fig. 5. Fig. 7 is a side view of the upper part of the machine shown in Fig. 1 with certain of its parts removed and broken away for clearness. Fig. 7ª is an enlarged detail of a portion of Fig. 7. Fig. 8 is a plan view of the fixed head-plate of the machine, showing the supporting, guiding, and actuating means for one of the feed-aprons hereinafter described. Fig. 9 is a plan view, Fig. 10 a front elevation, and Fig. 11 a side elevation, of the change-speed gearing for one of the feed-aprons and is hereinafter described. Fig. 12 is a side elevation of one of the posts or standards of the machine shown in Figs. 1 and 2, showing the automatic means for stopping the machine when the bale being formed has reached a predetermined size. Fig. 13 is a section in plan on line 13 13 of Fig. 12. Fig. 14 is a fragmental section in plan of part of the machine shown in Figs. 1 and 2, showing the mechanism for controlling and operating the jack. Figs. 15 and 16 are details of parts of the mechanism shown in Fig. 14. Figs. 17, 18, and 19 show different positions of the valve mechanism shown in Fig. 14. Figs. 20, 21, and 22 show different positions of the valve hereinafter described; and Figs. 23 and 24 are enlarged details of the feed-apron hereinafter described.

Having reference to the drawings, 1 represents the base of my improved machine for compressing fibrous materials. Fast on base 1 are four standards or posts 2, on the upper ends of which is fixed a head-plate 3, provided with a central opening 4, over which are arranged two plates 5 5, so shaped at their proximate edges and so relatively arranged as to leave two communicating slots 6 and 7 between them. Fast to base 1 is a jack-cylinder 8, telescoping with the movable jack member 9. Journaled on the upper end of the movable jack member 9 is a collar 10, having arms 11, and to the end of each arm 11 is fast a shoe 12, traveling on a way 13, fixed to the frame of the machine. The purpose of sleeve 10, journaled on the upper end of jack member 9 and traveling on ways 13, is to take up sidewise strains upon the jack member 9 when the machine is in operation. The movable member 9 carries a large concentric gear 14, driven by a broad-faced pinion 15, loose on a shaft 16, fixed at its ends to the frame of the machine. Shaft 16 carries a beveled gear 17, fixed to the end of pinion 15 and driven by a beveled pinion 18, fast on the main shaft 19, through which power is applied. Communicating with cylinder 8 is a conduit 20, in which is located a three-way valve 21, connected with a supply of water or other fluid under pressure. Before the machine is started in operation valve 21 is shifted by hand into the position shown in Fig. 22, which connects conduit 20 with a conduit 22, admitting fluid under pressure to cylinder 8. This raises the movable member 9 until its cap reaches head-plate 3, when valve 21 is shifted back into the position shown in Fig. 20. The machine is then started by throwing clutch 23 into action by means of the shipper mechanism, which will be described later, and when in action clutch 23 connects shaft 19 with a power-driven pulley 24 on said shaft. The rotation of the member 9 below slots 6 and 7 of head-plate 3 draws with it the fibers of the fibrous material, which are passed or drawn through slots 6 and 7 of the head-plate 3, and the continued feed of fibers through the slots causes a body of compressed fiber in spiral form to accumulate between the member 9 and head-plate 3, which body continues to grow as the machine continues to operate. In order to provide a yielding resistance to the growth of the body of compressed fiber between the head-plate 3 and the member 9, conduit 20 is connected by a by-pass 25 with conduit 22, and in this by-pass is a valve 26, closing on its seat against the pressure in conduit 20 and held there by the pressure in conduit 22, assisted by the spring 27. When the pressure in conduit 20 is sufficiently increased by the addition of fibers to the body of compressed fibers between the jack member 9 and head-plate 3, valve 26 is lifted and the excess pressure in conduit 20 is relieved through by-pass 25 into conduit 22, as will be clear. As will be clear from Fig. 2, the jack member 9, like the cylinder 8 of the jack, is made as a hollow cylinder and is closed at its upper end and surrounds cylinder 8, with gear 14 fast thereto near the lower end of member 9. This provides a novel and very compact form of jack which is particularly adapted to be used in a machine where the jack is the rotating member of the compressing mechanism.

Journaled in brackets 28, fast on the front post 2, upon that side of the machine adjacent to wheel 24 (see Figs. 3 and 13) is a rock-shaft 29, carrying a hand-lever 30, fast thereon, and also a lever 32, loosely pivoted thereon. One of the arms of lever 32 is connected by a spring 31 to an adjustable hook 33, fast on the lower one of a pair of brackets 34 on that post 2. The other arm of lever 32 engages a movable abutment 36, herein shown as a lever fulcrumed at 37 to the lower bracket 34. Pivoted at 38 to the upper bracket 34 is a parallel lever 39, one arm of which carries a weight 40, and the other arm is pivotally connected to a sleeve 41, fast on a rod 42, on the lower end of which rod is fast a duplicate sleeve 43. To sleeve 43 is pivotally connected one of the arms of the lever-abutment 36. Rod 42 has fast on it an adjustable shoe 44, which projects below and into the path of the large gear 14, as shown in Fig. 3. In starting the machine in operation the lever 30 is swung by the operator into the position indicated by dotted lines in Fig. 13, and an arm 45, fast on rock-shaft 29, engages a lug 50, depending from lever 32, and swings lever 32, with the rock-shaft 29, past abutment 36. Upon the release by the operator of lever 30 spring 31 tends, through its connection with lever 32 and through the engagement of lug 50 on lever 32 with arm 45, to return lever 32 and rock-shaft 29 to their first position, but is prevented from doing so by the presence of abutment 36 in the path of the adjacent arm of lever 32. When the body of compressed fiber has grown sufficiently to depress the member 9 far enough to cause gear 14 to engage shoe 44, further downward movement of gear 14 carries with it rod 42 and swings levers 36 and 39 on their pivots, thus carrying the abutting end of lever 36 out of the path of lever 32. The latter being then free is swung by spring 31 against a stop 51, fixed to the post 2. Through the engagement of the depending lug 50 on lever 32 with the arm 45, fast on rock-shaft 29, said arm is carried with lever 32, and shaft 29 is thereby rocked in the direction indicated by the arrow in Fig. 13. The shaft 29 has fast on it, near its lower end, an arm 52, to which is pivotally connected one end of a link 53, the other end of the link 53 being pivotally connected to a shipper-lever 54, connected in the usual manner with the movable member of the clutch 23. When lever 32 is swung by the spring 31 in the manner just described, carrying with it rock-shaft 29, shipper-lever 54 is operated and the driven pulley 24 is disconnected from shaft 19, thereby stopping the machine. Before lever 32, which is loose on rock-shaft 29, is automatically freed, as just described, shaft 29 is free to be rocked by the operator in the direction indicated by the arrow in Fig. 13 at any time while a bale is being formed in order to stop the machine by means of handle 30, such movement of shaft 29 merely carrying arm 45 away from lug 50. The machine is restarted by swinging the handle back into the dotted-line position shown in Fig. 13, with arm 45 against lug 50. The end of lever 36 adjacent lever 32 carries a spring-pressed latch at its end, which yields to allow the arm of lever 32 to pass freely when moved in the direction to start the machine, as just described. After the rotation of the jack has been stopped by automatically stopping the machine through the mechanism above described it remains to apply the stays to the body of compressed material and to remove the bale from the machine.

The ties used with my improved machine are preferably bail-shaped. To apply a tie to a completed bale, its ends or legs are inserted in and pushed through grooves 55, provided in head-plate 3, alongside opening 4, (see Fig. 8,) and the cross part of the bail-shaped tie is sprung and pressed through the slots 6 and 7 onto the top of the body of compressed fiber. One end or leg of the bail-shaped tie is made longer than the other, and this long end is entered and passed through one of the transverse grooves or openings 56, provided across the top face of the jack member 9. After this has been done the two ends of the tie are interlocked or otherwise united. Usually several of such ties are applied to a bale, there being as many grooves 56 provided in the top face of the member 9 of the jack as the designed number of ties, and after each tie has been applied the jack member 9 is partially rotated to bring another groove 56 in line with the slots 6 and 7. The bale so tied is removed after first lowering the jack member 9, with the bale on it, to the proper point, which latter operation is accomplished by shifting the valve 21 from the position shown in Fig. 20 to that shown in Fig. 21. This connects the conduit 20 with the exhaust 57, and the weight of the bale and the movable member 9 of the jack forces the water or other fluid from the cylinder 8, through conduit 20, into the exhaust 57, and when jack member 9 has been lowered sufficiently valve 21 is automatically returned to its intermediate position, (shown in Fig. 20,) which checks further movement of jack member 9. After the removal of the completed bale valve 21 is again shifted into the position shown in Fig. 22, which connects conduit 20 with conduit 22, the latter communicating with a supply of fluid under pressure, and the entrance of this fluid into cylinder 8 raises the jack member 9 back into position against head-plate 3. After the member 9 has reached its uppermost position valve 21 is automatically shifted back into its intermediate position. (Shown in Fig. 20.) When valve 21 is in its intermediate position, pressure on member 9, due to the formation and growth of a bale between said member and the fixed head-plate 3, is automatically relieved through by-pass 25, as will be clear, thus providing a constant adjustable yielding support for jack member 9.

Because of the fact that the pressure on the fluid used to raise the member 9 is very great, as is also the weight of member 9 and parts carried by it, including the bale when relieved of its support by the opening of conduit 20 to the exhaust, as above described, I have herein provided automatic means for operating valve 21, so as to close conduit 20 to the exhaust 57 when member 9 reaches the limit of its downward movement and so as to close conduit 20 to conduit 22 when member 9 reaches the limit of its movement toward the fixed head-plate 3. This automatically prevents member 9 from striking forcibly against either the head-plate 3 or the base of cylinder 8. The automatic means referred to comprises a rock-shaft 58, (see Figs. 3, 14, 15, 16, 17, 18, and 19,) journaled in brackets 59, fast on one of the posts 2. Fast on shaft 58 is an arm 60, connected by a link 61 with an arm 62, to which is also pivotally connected the stem 63 of the valve 21. Mounted loosely on shaft 58 next to and above the arm 60 is a second arm 64, whose hub is formed with a segment-shaped socket 65, into which projects a lug 66, fast on the hub of arm 60. In the side walls of the socket 65 are mounted adjustable stop-screws 67 for engaging the lug 66. The distance between the inner ends of these stop-screws 67 is sufficient to provide a limited amount of lost motion between arms 60 and 64, the purpose of which will be described later. Arm 64 is connected by a universal joint with a link 68, the other end of link 68 being connected by another universal joint with one arm of a bell-crank lever 69, pivoted at 70 to the lower of three brackets 71, fast on that post 2. Pivoted at 72 to the middle bracket 71 is an arm 73, and pivoted at 74 to the upper bracket 71 is a lever 75. One of the arms of bell-crank lever 69, arm 73, and one arm of lever 75 are pivotally connected each to a separate sleeve 76, fast on a bar 77. Fixed to bar 77, near the lower end thereof, is a shoe 78, which is similar to the shoe 44 on rod 42 at the opposite side of the machine, and likewise it projects into the path of the gear 14. When the machine is in operation forming a bale, arms 60 and 64 occupy the relative positions shown in Fig. 14, at which time valve 21 occupies the position shown in Fig. 20. When the body of compressed material has grown sufficiently to cause gear 14 to engage shoe 44 at the opposite side of the machine and stop the machine, as above described, the ties are applied to the bale, and the operator by means of a lever 79, fast on rock-shaft 58, then rocks shaft 58, so as to shift arm 60 from the position shown in Fig. 14 to the position shown in Fig. 17. This movement of arm 60, acting through link 61, shifts valve 21 from the position shown in Fig. 20 to that shown in Fig. 21, connecting conduit 20 with the exhaust 57, and the weight of member 9 and the bale carried by it forces the fluid out of cylinder 8 and causes member 9 to lower until gear 14 engages the shoe 78 on bar 77. The consequent forcing down of bar 77 causes bell-crank 69, acting through link 68, to shift arm 64 from the position shown in Fig. 17 to the position shown in Fig. 18. This movement of arm 64 causes one of the stop-screws 67 to engage lug 66 and shift arm 60 back to its first position. This return movement of arm 60, acting through link 61, returns valve 21 to its first position, thus closing the valve and checking further descent of member 9. After the bale has been removed from the jack the operator through lever 79 rocks shaft 58 in the opposite direction and into the position shown in Fig. 19, with lug 66 against the other stop-screw 67. This movement of arm 60, acting through link 61, shifts valve 21 from the position shown in Fig. 20 to that shown in Fig. 22, thus connecting the conduit 20 with conduit 22, which communicates with the supply of fluid under pressure, which raises member 9 back to head-plate 3. Before the upper end of the member 9 contacts with head-plate 3 gear 14 engages another shoe 801, fast on the upper end of bar 77, and lifts that bar and rocks bell-crank 69 in the opposite direction, and bell-crank 69, acting through link 68, shifts arm 64 from the position shown in Fig. 19 back to that shown in Fig. 14, with valve 21 closed, as in Fig. 20, and member 9 yieldingly supported. The weight of the rod 77 and parts upon the corresponding side of pivots 70, 72, and 74 is balanced by a weight 811, fast to one arm of lever 75. It will now be clear that when in moving upwardly gear 14 strikes shoe 801 valve 21 will be operated to gradually close conduit 20 to conduit 22, thereby stopping the further movement of member 9 in that direction, and that when in descending gear 14 strikes shoe 78 valve 21 is operated to gradually close conduit 20 to the exhaust 57, thereby stopping further movement of member 9 in that direction; also, that the movements of valve 21 from its intermediate position in either direction are effected manually by the operator through hand-lever 79.

Within and bordering one side of each of the slots 6 and 7 is arranged a cone-roll 80, (see Figs. 1, 4, and 6,) mounted on or integral with a shaft 81, journaled in a bearing 82, fast to head-plate 3. Each shaft 81 carries a beveled gear 83, driven by a bevel-pinion 84 on an upright shaft 85, journaled in bearings fixed on the frame. Each shaft 85 has mounted on it a sliding gear 86, driven by gear 14 and connected to its shaft 85 by a long key 871 on the shaft 85 and a keyway formed in said gear 86. These gears 86 are each provided with flanges 87, which embrace the large gear 14, so that gears 86 move up and down with gear 14. Fast on the upper end of each shaft 85 is a cam 88, which engages a cam-roll on one arm of a lever 89, pivoted on a bracket 90, fast to one of the bearings 82. The other arm of each lever 89 carries a fork 91, which straddles and is pivotally connected to a sleeve 92, sliding loosely on a rake 93. Each rake 93 at its outer end is forked and pivotally connected to a sleeve 95, loose on a crank or wrist pin 96, fast to cam 88. The inner end of each rake 93 carries a head 99, and the rake 93 on one side of the machine extends far enough across the machine for its head to be in proximity to and to coöperate with the cone-roll 80 upon the opposite side of the machine. As shown in Fig. 6ª, the shank 97 of fork 91 is held depressed against a stop by a spring 98 within a socket provided in the end of lever 89, the purpose of which is to provide a yielding backing or support for the inner end of rake 93. When the machine is in operation, the combined movements imparted to rake 93 by crank-pin 96 and cam 88, acting through lever 89, causes the head 99 of rake 93 to travel in an inclined somewhat circular path, whose lowest point is nearest the roll with which it coöperates, and the result of this is that whatever fibers are presented to rakes 93 are fed by them into proximity to the rolls 80.

Means are herein provided for carrying the material to be baled up to each slot 6 and 7, and as said means are duplicated for each slot it will be sufficient to describe the means appertaining to one of the slots—slot 6, for example. Fast on shaft 85 (see Figs. 6, 9, 10, and 11) is a pinion 100, which drives a gear 101, fast to or integral with a sleeve 102, to which is also fast a gear 103. Gear 101, sleeve 102, and gear 103 are all loose on a shaft 104, journaled in a supplemental bracket 105, supported by a bracket 106, fast to head-plate 3. Gear 103 drives a gear 107, compounded with which latter is a pinion 108, and gear 107 and pinion 108 are journaled loosely on a stud 109, fixed to the supplemental bracket 105. Pinion 108 drives an idler 110, journaled on a stud 111, fixed to an adjustable arm 112, whose hub is also journaled on stud 109. This arm 112 carries also a stud 113, on which is journaled a gear 114, which is driven by the idler 110. The hub 115 of gear 114 is detachably connected by a key and keyway 116 with a removable gear 117. The purpose of making this gear 117 removable and arm 112 adjustable will appear later. Gear 117 drives a gear 118 frictionally connected with the upper end of shaft 104, and on the lower end of shaft 104 is fixed a beveled pinion 119, which drives a beveled gear 120, fixed to the lower end of an inclined shaft 121. Gear 118 has been referred to as frictionally connected with the upper end of shaft 104. To effect this, the gear 118 is loosely mounted on shaft 104 and engaged frictionally by washer 104ª, of leather or the like, clamped against the face of gear 118 by a collar 104ᵇ, splined to shaft 104 and held in position with provision for adjustment by means of a nut 104ᶜ. Washer 104ª may be more or less pressed against gear 118 by collar 104ᵇ and nut 104ᶜ, so that the rotation of gear 118 acts through the friction existing between its face and washer 104ª to drive shaft 104. The purpose of this construction is to provide a drive for the feed-aprons which will yield when the resistance of the feed mechanism reaches a certain point, so that if for any reason the slots of the head-plate become choked and the travel of the aprons arrested gear 118 slips relatively to collar 104ᵇ, thus allowing the apron to be held stationary by an obstruction while the other parts of the machine are operating.

Fast to the sides of head-plate 3 are curved bracket-arms 122, which support the outer ends of a pair of bars 123, fast at their inner ends to the top of head-plate 3. Between the two pairs of bars 122 and 123 is a middle bar 124, fast at its inner end to head-plate 3 and at its outer end it is supported by a post 125, extending up from the floor or other base. Another bar, 126, is provided at one side of the machine, which is supported at each end by a post 127. The bars 123, 124, and 126 are all inclined toward head-plate 3 and lie in the same inclined plane, and on said bars are fixed endless tracks 128 and also guide-bars 129 just above the upper track 128, by means of which an endless apron 130 is guided and supported. The cross-bars of apron 130 are connected by endless chains 131, which are engaged by sprocket-wheels 132, fast on shaft 121, and also by sprocket-wheels 133, fast on a shaft 134, journaled in bearings on bar 126. The links of chains 131 are constructed as shown in Figs. 23 and 24, each link of the chain being provided with a fork 135, which straddles its track 128, and also with an antifriction-roll 136 in the crotch of the fork, which bears on the upper edge of its track. Above the upper track 128 are the guide-bars 129, which are parallel with said track and serve to cause the rolls 136 to follow the downward curve of tracks 128. The tracks 128 are so shaped that that portion of the upper half of apron 130 near slot 6 is guided in close to said slot, while the end portions and the under half of the apron are guided farther away from the machine in order to clear the same. Each cross-bar of the apron 130 is made with a perpendicular wing or wall 137, and between these walls are compartments into which the long fibers are laid in strands or bunches by the operator. The strands are placed lengthwise in the compartments upon the upper side of the apron 130 and at that end of the apron which is traveling toward slot 6 and also with the lower ends of the strands of fibers projecting more or less beyond the inner or lower edge of the apron into a trough 138, fixed to head-plate 3. This trough supports and gages the overhanging ends of the fibers as they travel toward and until they reach plate 5. When the overhanging ends of the fibers are brought up to the rake 93, pertaining to the roll 80 of slot 6, they are forced by the rake into the angle between the cone-roll 80 and the rotating bale-head to be drawn into the press. The fibers are laid into the compartments of apron 130 in bunches or strands and more or less loosely by the operator, and in order to prevent the fibers of one compartment becoming entangled with those of an adjoining one while they are being withdrawn from the compartment I provide a number of star-wheels 139, fixed on a shaft 140, journaled in bearings on a beam 141. The inner end of beam 141 is fast to one of the brackets 90, and the other end is fast to a bracket 142 on the upper end of a post 143, extending up from the floor on which the machine rests. Shaft 140 carries a sprocket-wheel 144, which is driven through a chain 145 by a sprocket-wheel 146, compounded with a beveled gear 147. Gear 147 and sprocket-wheel 146 are loose on a stud 148, projecting from one of the bars 123, and beveled gear 147 is driven by a bevel-gear 149, fast on shaft 121. This connection of shaft 140 and shaft 121 rotates star-wheels 139 in the same direction and at the same speed with apron 130 and causes the arms of the wheels to enter the compartment of apron 130 and to press the fibers down into the same. After leaving wheels 139 the apron passes under bars 150, which are close to the top of the apron and whose function is to prevent the displacement of the strand of fibers in the compartments while they are being drawn out through slot 6. Bars 150 are each fast at one end to the beam 141 and at its other end to a beam 151, connected at its outer end with bracket 142 and at its inner end with the other bracket 90. Fast to lugs 152, provided on the bars 123, 124, and 126, is a cross-bar 153, (see Fig. 7 and Fig. 7ª,) herein shown as a length of angle-iron, and at intervals throughout its length it has fastened to it straps 154, which support one edge of a rounded shield 155, the inner edge of which passes over and is fastened to angle-iron 153. Between the shield 155 and apron 130 is a somewhat triangular-shaped piece of sheet metal 156, which closes the space between the apron and the shield and which is also fastened to the angle-iron cross-bar 153. The strands of the long fibers which are placed in the compartments are sometimes much longer than the width of apron 130 and extend from the compartments of the apron over shield 155, from which their ends hang loosely and are thereby prevented from becoming entangled with any parts of the machine while on their way to the slot 6.

It will be observed that the inner ends of the strands of fibers on the apron 130 are presented to the inner end of slot 6 first and that as apron 130 travels along its path the compartments are caused to traverse slot 6, with the result that the strand of fibers held in any one compartment is caused to be laid onto the top of the body of compressed material below head-plate 3 in a spiral, starting at the center of the body of compressed material and ending at its periphery. The speed of apron 130 is in inverse ratio to the length of fiber being operated upon and is regulated relatively to the speed of rotation of jack member 8, so that the end of the strand of fibers in a compartment will leave the compartment at or near the end of slot 6. In order to adapt the machine to fibers of different lengths, provision is herein made for changing the speed of apron 130 to suit the length of fibers to be operated upon. These changes in the speed of apron 130 are effected by simply removing gear 117 from the hub 115 of gear 114 and substituting a gear of the desired size to produce the required speed of apron 130. When a gear 117 of a different size is substituted, of course the distance between shaft 104 and stud 113 must be changed also, and it is to permit of this that arm 112 is journaled loosely on stud 109, so that when a smaller gear 117 is substituted arm 112 may be swung on stud 109 toward shaft 104 and when a larger gear 117 is substituted arm 112 may be swung away from shaft 104. For locking arm 112 in place a spring-pressed pawl-lever 157 is provided pivoted at 158 to the hub of arm 112. Pawl 157 engages a rack 158ª on an arm or bracket 159, whose hub is mounted on stud 109 and locked to supplemental bracket 105 by a pin 160.

Hemp, jute, and like fibers are, as is well known, quite long, particularly Manila hemp, which measures sometimes from twelve to fifteen feet in length. Therefore it will be apparent that the endless feed mechanism above described is particularly desirable for handling such fibers. It is obvious that any other suitable feeding means may be substituted for that herein shown when the machine is to be used to operate upon short fibers, as cotton and the like.

What I claim is—

1. In a machine for compressing fibrous materials, in combination a fixed head-plate provided with one or more slots; a rotatable jack coöperating with the fixed head-plate; and means for rotating the jack.

2. In a machine for compressing fibrous materials, in combination, a fixed head-plate provided with one or more slots; a rotatable jack coöperating with the fixed head-plate; and means for positively rotating said jack.

3. In a machine for compressing fibrous materials, in combination, a fixed head-plate provided with one or more slots; a rotatable jack coöperating with the fixed head-plate, and means for rotating and yieldingly supporting said jack.

4. In a machine for compressing fibrous materials, in combination, a fixed head-plate provided with one or more slots; a rotatable jack coöperating with the fixed head-plate; a wheel fast on the jack; and means for transmitting motion to said wheel.

5. In a machine for compressing fibrous materials, in combination, a fixed head-plate provided with one or more slots; a rotatable jack coöperating with the fixed head-plate; a gear fast on the jack; and a driving-gear meshing with the gear on the jack.

6. In a machine for compressing fibrous materials, in combination, a fixed head-plate provided with one or more slots; a rotatable jack coöperating with the fixed plate; a gear fast on the jack; and a broad-faced driving-gear meshing with the gear on the jack.

7. In a machine for compressing fibrous materials, in combination, a fixed head-plate provided with one or more slots; a rotatable jack coöperating with the fixed head-plate; means for rotating the jack, and means for stopping the rotation of the jack when the body of compressed material has reached a predetermined size.

8. In a machine for compressing fibrous materials, in combination, a fixed head-plate provided with one or more slots; a rotatable jack coöperating with the fixed head-plate; means for rotating the jack; and automatic means for stopping the machine when the body of compressed material has reached a predetermined size.

9. In a machine for compressing fibrous materials, in combination, a rotatable jack; a shaft for rotating said jack; means connecting the shaft and jack; a power-driven wheel on said shaft; a clutch for connecting the power-driven wheel with the shaft; and automatic means controlled by the jack for operating the clutch to disconnect the power-driven wheel from the shaft when the bale has grown to a predetermined size.

10. In a machine for compressing fibrous materials, in combination, a rotatable jack; a shaft for rotating said jack; means connecting the shaft and jack; a power-driven wheel on the shaft; and adjustable automatic means controlled by the jack for operating the clutch to disconnect the power-driven wheel from the shaft when the bale has grown to a size predetermined by the adjustment of said means.

11. In a machine for compressing fibrous materials, in combination, a rotatable jack; a shaft for rotating said jack; means connecting the shaft and jack; a power-driven wheel on said shaft; a clutch for connecting the power-driven wheel with the shaft; a lever; means for connecting the lever with the movable member of the clutch; a spring for actuating the lever; a movable abutment for engaging the lever and opposing the spring; means for holding the abutment in the path of the lever, and means controlled by the jack for moving the abutment out of the path of the lever when the bale has grown to a predetermined size.

12. In a machine for compressing fibrous materials, in combination, a rotatable jack; a shaft for rotating said jack; means connecting the shaft and jack; a power-driven wheel on said shaft; a clutch for connecting the power-driven wheel with said shaft; a rock-shaft; means connecting the rock-shaft with the movable member of the clutch; a lever loosely pivoted on said rock-shaft; an arm fast on the rock-shaft projecting into the path of said lever; a spring for actuating said lever; a movable abutment for engaging the lever and opposing the spring; means for holding the abutment in the path of the lever; and means controlled by the jack for moving the abutment out of the path of the lever when the bale has grown to a predetermined size.

13. In a machine for compressing fibrous materials, in combination, a driving-shaft; fiber-feeding mechanism; and a train of change-speed gearing for actuating said mechanism, said gearing comprising two power-transmitting parts connected by friction so as to permit the fiber-feed mechanism to stop independently of said driving-shaft.

14. In a machine for compressing fibrous materials, in combination, a fixed head-plate provided with one or more slots; a rotatable jack coöperating with the fixed head-plate; a gear fast to the movable member of the jack; a driving-gear engaging the gear on the jack; a flanged gear engaging the gear on the jack; a shaft on which the flanged gear is mounted; means fastening said flanged gear to its shaft with provision for movement of said gear lengthwise of the shaft; a conical roll in the slot or slots of the fixed head-plate and power-transmitting means connecting the shaft and conical roll.

15. In a machine for compressing fibrous materials, in combination, a fixed head-plate, provided with a pair of slots; a rotatable jack coöperating with the fixed head-plate; a gear fast to the movable member of the jack; a jack-driving gear engaging the gear on the jack; a pair of flanged gears engaging the gear on the jack; a pair of shafts on which the flanged gears are mounted; means fastening each flanged gear to its respective shaft with provision for movement of the gear longitudinally of the shaft; a conical roll in each slot of the fixed head-plate, and power-transmitting means connecting each shaft with one of the rolls.

16. In a machine for compressing fibrous materials, in combination, a fixed head-plate provided with a slot; a rotatable jack coöperating with the fixed head-plate; a gear fast to the movable member of the jack; a jack-driving gear engaging the gear on the jack; a flanged gear engaging the gear on the jack; a shaft on which the flanged gear is mounted; means fastening said flanged gear to its shaft with provision for movement of said gear with the gear on the jack lengthwise of the shaft, an endless feed-apron adapted to supply fibers to the slot in the head-plate; and actuating mechanism for the apron driven by said shaft.

17. In a machine for compressing fibrous materials, in combination, a fixed head-plate provided with a slot; a rotatable jack coöperating with the fixed head-plate; a gear fast to the movable member of the jack, a jack-driving gear engaging the gear on the jack; a flanged driven gear engaging the gear on the jack; a shaft on which the flanged gear is mounted; means for fastening said flanged gear to its shaft with provision for movement of said gear with the gear on the jack lengthwise of the shaft; an endless feed-apron for supplying fibers to the head-plate slot; and change-speed-actuating mechanism for the apron driven by said shaft.

18. In a machine for compressing fibrous materials, in combination a fixed head-plate provided with a slot; a rotatable jack coöperating with the fixed head-plate; a gear fast to the movable member of the jack, a jack-driving gear engaging the gear on the jack, a flanged driven gear engaging the gear on the jack; a shaft on which the flanged gear is mounted; means fastening the flanged gear to its shaft with provision for movement of said gear with the gear on the jack lengthwise of its shaft; a conical roll in the slot of the head-plate; means connecting the conical roll with the shaft; an endless apron for supplying fibers to the slot in the head-plate; an actuating mechanism for said apron driven by said shaft.

19. A machine for compressing fibrous materials, comprising a fixed head-plate provided with a pair of slots; a rotatable jack coöperating with the fixed head-plate; a gear fast to the movable member of the jack; a power-driven gear engaging the gear on the jack; a pair of flanged gears driven by the gear on the jack; a pair of shafts on each of which one of the flanged gears is mounted; means fastening each flanged gear to its shaft with provision for movement lengthwise of its shaft; a conical roll coöperating with each slot of the head-plate; means connecting each conical roll with one of the shafts; a pair of endless aprons each supplying fiber to one of the slots of the head-plate; and actuating mechanism connecting each apron with one of said shafts.

20. In a machine for compressing fibrous materials, in combination, a slotted head-plate; a rake; means for simultaneously reciprocating the rake longitudinally and transversely of its axis to move the fibers toward the slot of the head-plate.

21. In a machine for compressing fibrous materials, in combination, a slotted head-plate; a rake; a reciprocating member connected with one end of the rake; a rotating member connected with the other end of the rake, and means for actuating said members.

22. In a machine for compressing fibrous materials, in combination, a slotted head-plate; a rake; a lever connected with one end of the rake; means for actuating the lever; a rotating member connected with the other end of the rake; and means for actuating the rotating member.

23. In a machine for compressing fibrous materials, in combination, a slotted head-plate; a rake; a lever connected with one end of the rake; a cam for actuating the lever; a rotating member connected with the other end of the rake; and means for actuating the cam and rotating member.

24. In a machine for compressing fibrous materials, in combination, a slotted head-plate; a rake; a lever connected with one end of the rake; a cam for actuating the lever; a crank-pin connected with the other end of the rake; and means for actuating the cam and crank-pin.

25. In a machine for compressing fibrous materials, in combination, a slotted head-plate; a rake; a lever connected with one end of the rake; a cam for actuating the lever; a crank-pin carried by the cam and connected with the other end of the rake; and means for actuating the cam.

26. In a machine for compressing fibrous materials, in combination, a fixed slotted headplate; a jack comprising a fixed cylinder; a hollow cylindrical member closed at its upper end surrounding and telescoping with the fixed cylinder, a conduit communicating with the fixed cylinder; and means for rotating the movable member.

Signed by me at Boston, Massachusetts, this 30th day of March, 1903.

JAMES T. COWLEY.

Witnesses:
EVERETT E. KENT,
FREDERIC S. GOODWIN.